2,774,721

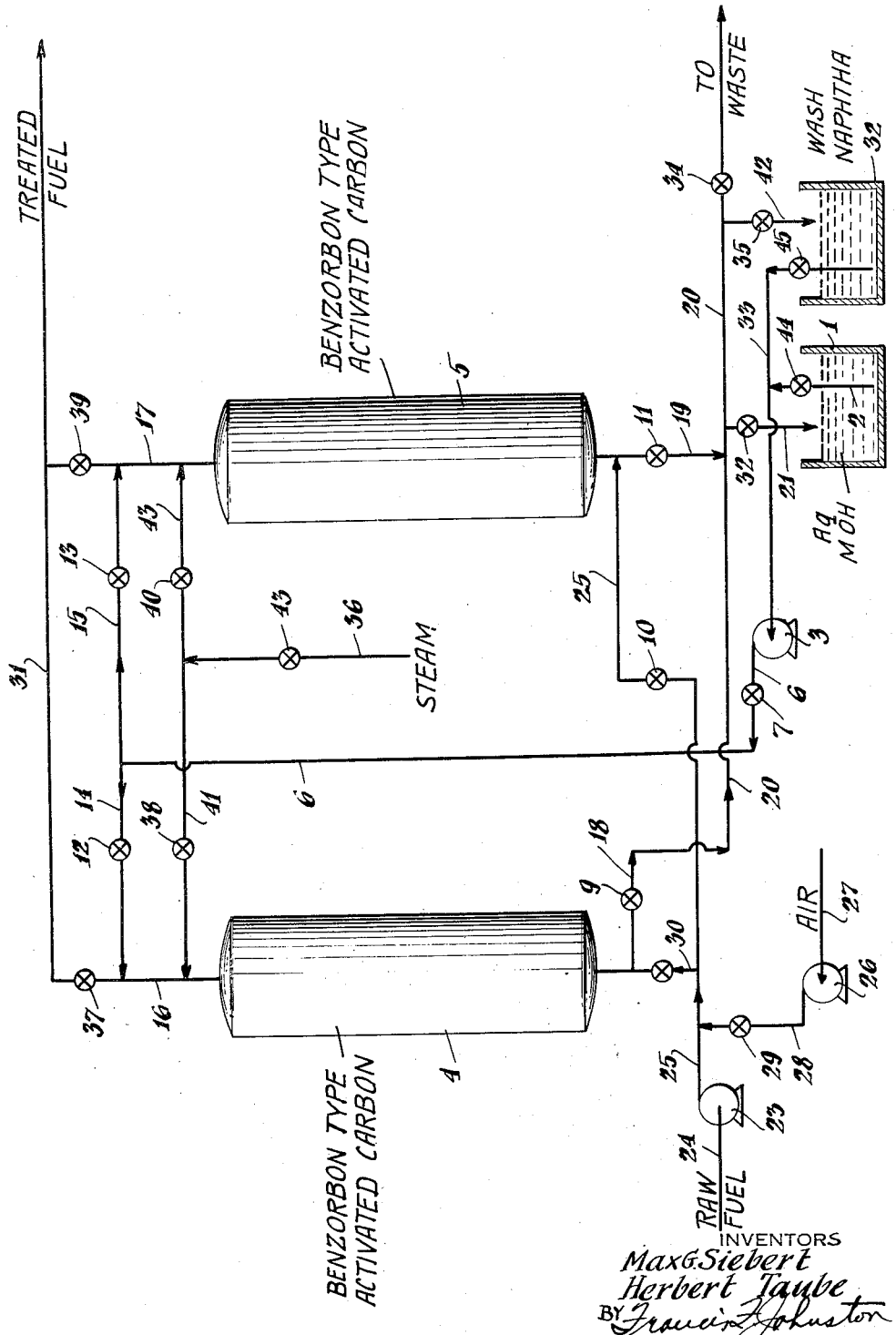

STABILIZING FUEL OIL BY OXIDATION IN THE PRESENCE OF ACTIVE CARBON IMPREGNATED WITH ALKALI

Max G. Siebert and Herbert Taube, Bremen, Germany, assignors, by mesne assignments, to Socony Mobil Oil Company, Inc., a corporation of New York Application July 13, 1954, Serial No. 443,124

2 Claims. (Cl. 196—42)

The present invention relates to the stabilization of fuel oil with respect to sedimentation and color, and, more particularly, to the stabilization of cracked fuel oil with respect to sedimentation and color by means of an oxidation reaction.

With the increased demand for fuel oil for domestic heating, it has become necessary to increase the amount of distillate fuel oil derived from cracking, particularly catalytic cracking operations. It has been demonstrated in the co-pending application for United States Letters Patent, Serial No. 247,373, filed September 19, 1951, in the names of Harry L. Coonradt and Wilbur K. Leaman, that the straight-run component of fuel oils for domestic or industrial burners, by itself and untreated, is relatively stable. The catalytically cracked stock alone is very unstable, and blends of the catalytically cracked stock with straight-run stock likewise are very unstable with respect to color and/or sedimentation. In the treatment of blends or mixtures of cracked and straight-run distillate fuel oil by the method hereinafter described, it has been found that whereas treatment solely of the straight-run component of the blend contributed very little to the stabilization of the mixture, treatment of the catalytically cracked component only was sufficient to provide a mixture stabilized as to color and/or sedimentation. Accordingly, mixtures of straight-run and catalytically cracked fuel oils can be stabilized (1) by treating the catalytically cracked component alone, or (2) the mixture can be treated. Either of these treatments provides a mixture of fuel oil stabilized with respect to color and/or sedimentation.

Two methods of determining stability of fuel oil components or fuel oil mixtures with respect to color and sedimentation were employed whereby the data presented hereinafter were obtained. These methods are designated (1) the 212° F. stability test which is of 24 hours duration, and (2) the 110° F. stability test which, as employed in conjunction with the present work, is either of three or six weeks duration.

110° F. stability test

In this test, 500 milliliters of the fuel to be tested is stored in a beaker covered with a watch glass in a mechanically convected oven at a temperature of 110° F.±2° F. After a period of three, and again after a period of six weeks, i. e., six weeks total, the contents of the beaker is examined to determine the color. The total amount of sediment is determined at the end of the test, i. e., either at the end of three weeks or at the end of six weeks which ever is the total elapsed time of the test.

The color of the fuel to be tested is measured photoelectrically in terms of light transmission and correlated to the NPA color scale. Reproducibility is better than ½ NPA color unit.

Sediment is determined by filtration of the fuel to be tested through an asbestos mat in a Gooch crucible and reported as milligrams per liter.

Another means of determining the effectiveness of the treatment of fuel oils suitable for use in domestic burners is the so-called lead corrosion test (1). This test is performed as follows:

Lead corrosion test (1)

Lead sheet 1.5 millimeters thick of 99.99% purity is used. The sheet is cut into strips 50 x 200 millimeters having a total surface area of 200 square centimeters. The strips are polished on both sides with fine emery paper, wiped with cotton saturated with a volatile solvent for grease such as gasoline and rinsed with gasoline. The strips are bent to form an annulus and placed in a glass container such as a beaker of 500 milliliters capacity and completely covered with 250 ml. of the fuel oil to be tested.

The oil and lead strips are held at room temperature, about 20° C. (68° F.) for eight hours while the oil is continuously stirred employing a glass stirrer. After eight hours a 20 milliliter sample is taken into a cylinder as prescribed for the "doctor"-test to which 5 milliliters of a 10% aqueous sodium sulfide solution is added and shaken for one minute. The absence of any visual deposit of black lead sulfide is indicative of a highly satisfactorily treated oil which is non-corrosive to lead. However, on occasion the lead corrosion test is not negative but positive as established by the formation of a visual deposit of lead sulfide. Comparison of the reduction of lead corrosiveness can be determined when a positive result is obtained by determining the amount of lead present in the tested oil after test. It is preferred to determine the amount of lead present in the tesed oil as follows:

One hundred milliliters of tested oil are poured from the corrosion test container into a separatory funnel of suitable capacity, say 200 or 250 milliliters and about 50 milliliters of 5% acetic acid are added. The contents of the funnel are shaken thoroughly for five minutes. The mixture is then allowed to remain quiescent until two layers are formed. The lower layer (aqueous) is withdrawn. The upper (test oil) is washed repeatedly with small amounts of 5% acetic acid. The acetic acid washes and the separated lower layer supra are combined and neutralized with aqueous ammonia until a clearly perceptible alkaline reaction is observed. An excess of an aqueous 10% solution of sodium sulfide is then added to the alkaline solution. The solution is then filtered usually after the addition of a filter aid such as paper pulp. The suspension is allowed to settle and filtered in any suitable manner preferably on a folded paper filter. The precipitate of lead sulfide is washed thoroughly with water until the wash water is negative to hydrogen sulfide. The precipitate is then transferred to an Erlenmeyer flask, 100 milliliters of distilled water added and titrated with 0.1 N-iodine solution in an amount in excess of that required to react with the lead sulfide. The solution is then acidified by the addition of some dilute hydrochloric acid and the contents of the flask thoroughly shaken for some time, say about 5 minutes. The unreacted iodine in the acidified solution is then back-titrated with 0.1 N-sodium thiosulfate solution using a zinc-iodine starch solution internal indicator. The amount of lead dissolved in the oil can be calculated from the following equation:

mg. Pb/100 ml. oil = [(ml. 0.1 iodine solution) −
        (ml. 0.1 thiosulfate solution)] × 10.36.

The permissible variation between check samples is ±1 mg.

Alternatively the corrosiveness of the treated oil can be determined in the following manner:

Lead corrosion test (2)

The following reagents are required for the oxidation deposit test.

(a) Sulfur solution: 25 grams flowers of sulfur dissolved in 300 milliliters of carbon disulfide and made up to 500 milliliters with chemically pure benzene. After filtering, the solution is ready for use.

(b) N/20 iodine solution —0.05 equivalent of iodine plus two equivalents of potassium iodide.

(c) N/20 sodium thiosulfate solution.

(d) Concentrated sulfuric acid.

(e) Concentrated nitric acid.

(f) Concentrated aqueous ammonia.

(g) Concentrated acetic acid (glacial).

(h) Ammonium acetate.

(i) Iodine-zinc-starch solution (indicator).

(j) 5% sodium sulfide solution.

Strips of sheet lead similar to those used in the lead corrosion test described hereinbefore are polished and cleaned as described in that test. The test strip is formed into an annulus, placed in a 500 milliliter beaker and covered with 250 milliliters of oil to be tested. The oil is stirred for eight hours at room temperature (68° F.)

Qualitative test

A 20 milliliter sample of the test oil is taken from the beaker and poured into a cylinder as prescribed for the "doctor" test. Five milliliters of distilled water and 2 milliliters of sulfur solution (a-supra) are added to the oil and the cylinder shaken for one minute. The appearance of a brown precipitate at the interface of the oil and water layers is positive.

A particularly severe test of the quality of the oil involves shaking 20 milliliters of the test oil with 5 milliliters of 5% sodium sulfide solution (j-supra). Light brown coloring of the aqueous layer by traces of lead sulfide is indicative of acceptable oil.

Quantitative test

The test is based upon the conversion of lead compounds in the oil to precipitate lead sulfate by concentrated sulfuric acid and nitric acid. The lead sulfate is converted to lead acetate and then to lead sulfide. The lead sulfide is then titrated with iodine and thiosulfate solution as described hereinbefore.

Test procedure: If sediment is formed during the test a portion of the test oil is filtered under suction. The residue on the filter is washed with precipitation naphtha and dried at 80° C. By weighing the filter before and after use the weight of the sediment produced can be determined. The lead content of the sediment can be determined as described hereinafter.

For determination of the lead in the tested oil, the following procedure is followed:

One hundred milliliters of test oil freed—if necessary—of sediment is shaken with 25 milliliters of sulfur solution (a-supra) for 3 to 5 minutes in a 250 milliliters cylinder. The sediment formed is filtered under slight vacuum and washed once or twice with precipitation naphtha. The washed residue is quantitatively removed to a Kjedahl flask and 5 milliliters of concentrated sulfuric acid added. The contents of the flask is heated until the residue cokes. Concentrated nitric acid is then added in a dropwise fashion until a test sample has a transparent appearance colored from light yellow to water-white. The nitric acid is then evaporated completely. The contents of the flask is diluted with water and rinsed into a flask (750 ml. Erlenmeyer). The sample is neutralized with ammonia, made slightly acid with concentrated acetic acid and, after the addition of about 5 grams ammonium acetate boiled for 5 minutes. The sample is cooled, filter aid such as paper pulp added and the lead precipitated as the sulfide by the addition of sodium sulfide. The precipitated lead sulfide is filtered off on a folded filter, rinsed carefully with water until free from hydrogen sulfide, suspended in distilled water and the lead determined iodometrically as described hereinbefore. The lead is reported as milligrams of lead per 100 milliliters of oil.

Furthermore, the effectiveness of the treatment of fuel oils can be determined by the so-called oxidation deposit test.

The following oxidation deposit test serves for determining the storage stability of fractions such as gas oils, furnace oils and the like.

Fifty grams of oil are weighed into a cleaned, dried and weighed glass container and placed in a bomb. (The testing equipment used for determining the oxidation stability of gasoline according to A. S. T. M. D525/49 is preferred.) The bomb is purged twice with oxygen and pressured with oxygen to 100 pounds per square inch (7 kg./cm.$^{-2}$). The bomb is then placed in a bath of boiling water and held at that temperature for eight hours. The bomb is then removed from the bath, cooled and opened. The oil is poured into a tared glass container (dish), glass container of bomb rinsed thoroughly with gasoline and the tared glass container dried for 1 hour at 110° C. After cooling to room temperature, the tared glass container is weighed. The difference in weight multiplied by two is reported as milligrams per 100 grams of oil. (B gms. —A gms.)×2=milligrams/100 g. oil.

The problem of stabilizing fuel oils, particularly fuel oils obtained from cracking operations, has been the cause of considerable effort to find economical ways and means for overcoming the difficulty. To date, all investigations generally known have proceeded from the hypothesis that stabilization was inherently a question of the concentration of sulfur compounds. As a consequence, published data have been obtained as a result of treating the unstable fuel oil with a reagent which would react with sulfur compounds such as mercaptans. For example, aqueous alkali metal hydroxide solutions in various concentrations have been employed to remove the mercaptans. The use of ion-exchange resins capable of reacting with mercaptans and being regenerated has been suggested. In general, those processes in which alkali metal hydroxides in aqueous solutions have been employed have been processes in which the treating reagent has not been regenerated and in which the alkaline reagent has been discarded when spent. In contrast, the present method of treating fuel oils to stabilize the oils with respect to sedimentation and/or color basically involves a mild oxidation employing a regeneratable catalyst.

As compared with previous practice, today the cracking of heavy oils is more severe. This fact together with the growing use of cracked gas oils has been the cause for a decrease in the stability not only of fuel oils for domestic and industrial burners, but also of diesel fuels. This condition of the fuel oils is manifested in several ways. For example, the cracked gas oil, the source of the diesel and burner fuels or at least one component thereof, darkens after conventional finishing, attacks metals such as are present in diesel engines and forms metal-containing compounds with the metal attacked. This attack of the metals of the engine and the formation of deposits are detrimental to the proper functioning of the engine and tend to increase the rate of carbon deposition during operation. However, it is not to be assumed that these outward manifestations of the presence of undesirable materials in the cracked gas oil are in all cases related to the kind and extent or conditioned by one and the same undesirable material in the cracked gas oil or fraction thereof. But in the majority of cases they occur simultaneously. Therefore, any attempts to improve the stability of these fuels must be directed toward the elimination or correction of all the indicated undesired characteristics of these fuels. Attempts have been made to overcome these difficulties by sulfuric acid treatment, and clay contacting. Additives, for example, were used to disperse any sediment formed but were found to have a very limited effect. In addition, refining with solvents such as low molecular weight alcohols, aliphatic ketones, dioxane, alkoxydiglycols, pyridine, aliphatic and/or aromatic and/or aliphatic-aromatic hydrocarbons and/or their derivatives, was attempted and found unsatisfactory because in addition to removing undesirable materials the solvent treating removed desirable components of the fuels.

Upon examination of cracked gas oils which displayed the aforementioned undesirable characteristics it was found that, in addition to mercaptans substances of the phenolic type, pyrrolic and/or indolic type materials also were present. On the basis of this information, the fact that it is known that many phenols are oxidized by air through the dioxybenzenes to ortho- and para-quinones which, upon polymerization and further oxidation, form brown and dark-brown coloring materials, and the fact that it is known that many pyrroles and indoles behave in the same manner, it was postulated that the undesirable characteristics of fuel oils containing phenolic, pyrrolic and indolic type compounds could be explained. It has been postulated in the articles entitled "Synthesis of 5:6-Dimethoxy indole and its 2-Carboxylic Acid," A. E. Oxford and H. S. Raper, JCS 129, 417–422 (1927), and "The Tyrosenase-Tyrosine Reaction Production from Tyrosins of 5:6-Dihydroxyindone and 5:6-Dihydroxyindol-2-Carboxylic Acid—The Precursors of Melanin," H. S. Raper, Bio. J. 21, 89–96 (1927), that in the natural formation of melanine phenolic or pyrrolic or indolic substances are involved and that the reaction is substantially the same whether from the phenolic type or the pyrrolic or indolic type of material. Raper suggests that 1-tyrosine forms melanine by oxidation and ringclosure through a dioxindole intermediate. It is to be observed that 1-tyrosine, -(p-hydroxyphenyl)-alanine contains a phenolic ring. This concept of mechanism of the formation of sediment and color bodies in cracked fuels would explain why the attack of metal, the formation of sediment and of color bodies by fuels so characterized usually occur together. Thus, when the monohydroxy phenols are converted into the polyhydroxyphenols, the acidity of the latter is greater and the corrosion of metals greater than that of the former. Furthermore, with the greater corrosion of the metals, iron, copper, etc. a concentration of the metal phenolate is reached at which the metal phenolate acts as a catalyst for the oxidation. This in turn increases the corrosion of the metal and the formation of the color bodies. For example, it has been found that the high molecular weight color body found in discolored fuel oil may contain up to about 51 percent of heavy metal. This color body is colloidal in nature, the particle size tends to increase upon further oxidation and deflocculates as do the melanines produced from phenolic, pyrrolic or indolic materials. The foregoing observations when taken in conjunction with Raper's postulations, therefore, give substantial basis to the hypothesis that proposes that the stability of fuel oils with respect to sedimentation, discoloration and formation of metal deposits etc. can be improved by removing phenolic, pyrrolic and indolic type constituents of the fuel oils.

It is well known that alkyl as well as aryl mercaptans are present in petroleum fractions. Mercaptans are represented by the formula RSH wherein R is either an alkyl or aryl radical. It is generally accepted that in the removal of mercaptans from petroleum fractions with alkali metal hydroxide, a reaction occurs between the mercaptans and the alkali hydroxide which can be represented by the equation:

$$RSH + MOH = RSM + H_2O$$

It is also known that phenols can be extracted from petroleum fractions with alkali metal hydroxide. The reaction involved is represented by the equation:

$$ROH + MOH = ROM + H_2O$$

Thus, the removal of mercaptans or phenols from petroleum fractions by extraction with alkali metal hydroxide solutions involves a reaction in which the hydrogen of the hydroxyl or sulfhydril group is replaced by the metal of the alkali metal hydroxide as typified by the equations:

$$CH_3CH_2SH + MOH = CH_3CH_2SM + H_2O$$
$$C_6H_5SH + MOH = C_6H_5SM + H_2O$$
$$C_6H_5OH + MOH = C_6H_5OM + H_2O$$

However, the structures of the pyrrols and indoles are not such as would encourage the expectation that a similar reaction would take place between a pyrrol or an indole and an alkali metal hydroxide. The structural formula of pyrrol is

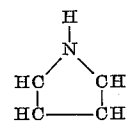

and that of indole is

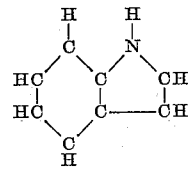

However, it has been found that a mildly oxidizing treatment of the unstable fuel oils in the presence of activated carbon provides a treated fuel oil stable with respect to sedimentation and color and with sharply reduced tendency to corrode the metals of engines.

The unstable oil is stabilized and its tendency to corrode metals such as the components of diesel engines by contacting the untreated or raw oil with air or other gas containing free oxygen in the presence of alkali metal hydroxide and activated carbon. The preferred activated carbon is one of the "Benzorbon" type characterized by the following properties:

| | |
|---|---:|
| Bulk density, moist, lb. per cf | 22.02 |
| Bulk density (dried at 220° F.), lb. per cf | 18.53 |
| True density (voids filled with helium) lb. per cf | 118.00 |
| Surface area, m.²/gm | 1485 |
| Average pore diameter, A | 41 |
| pH at 28° C.: | |
|   Suspended in water | 5.1 |
|   Filtrate from suspension | 4.5 |

It is to be observed that "Benzorbon" type carbons have a steep adsorption isotherm and a high percentage of coarse pores. On the other hand, activated carbons having poor effectiveness for the purpose of the present invention have flat adsorption isotherm and a high percentage of fine pores. These latter activated carbons are practically inoperative for the purpose of the present invention.

For example, a raw cracked gas oil having a mercaptan sulfur content of about 0.035 percent by weight was pumped at room temperature at a rate of 1 liter per hour through a bed of activated carbon of the "Benzorbon" type containing 70 grams of carbon which had previously been impregnated with sodium hydroxide. Simultaneously, air was blown through the bed of carbon. After passing 180 liters of the aforesaid gas oil through the aforementioned bed of "Benzorbon" type activated carbon at the rate of about 1 liter per hour, the throughput was raised to 2 liters per hour at which rate 20 liters of raw cracked gas oil were passed through the bed of "Benzorbon" activated carbon. Thereafter, the throughput rate was reduced to about 1 liter per hour and 35 liters passed through the bed of "Benzorbon" type activated carbon for a total of 235 liters of raw gas oil. The data so obtained are presented in Table I. Several interesting observations based upon these data can be made.

TABLE I 1 liter/hr./70 gms. carbon=81.52 bbl./hr./ton.
Surface area of 70 gms. "Benzorbon" type carbon=103,950 sq. meters, or 1.4849985 × 10⁶ sq. m./k., or 0.5735 sq. m./k., or 520.3 sq. miles/ton of "Benzorbon" type activated carbon.
1 liter/hr./70 gms.=81.5 bbls./ton.

| Cracked gas oil throughput, liters | Hours on Stream | Rate, liters/hr. | Mercaptan Sulfur percent weight | Oxidation Deposit, mg./liter | Lead Corrosion, Pb mg./100 cm.³ |
|---|---|---|---|---|---|
| 0 | | 0 | 0.038 | 0 | 40 |
| 0-10 | 10 | 1 | 0.0002 | 0 | ¹ neg. |
| 11-20 | 20 | 1 | 0.0003 | 0 | neg. |
| 21-30 | 30 | 1 | 0.0004 | 0 | neg. |
| 31-40 | 40 | 1 | 0.0003 | 0 | neg. |
| 41-50 | 50 | 1 | 0.0002 | 0 | neg. |
| 51-60 | 60 | 1 | 0.0003 | 0 | neg. |
| 61-70 | 70 | 1 | 0.0004 | 0 | neg. |
| 71-80 | 80 | 1 | 0.0005 | 0 | neg. |
| 81-90 | 90 | 1 | 0.0005 | 0 | neg. |
| 91-100 | 100 | 1 | 0.0005 | 0.2 | neg. |
| 101-110 | 110 | 1 | 0.0005 | 0 | neg. |
| 111-120 | 120 | 1 | 0.0005 | 0 | neg. |
| 121-130 | 130 | 1 | 0.0005 | 1.0 | neg. |
| 131-140 | 140 | 1 | 0.0005 | 0 | neg. |
| 141-150 | 150 | 1 | 0.0005 | 0 | neg. |
| 151-160 | 160 | 1 | 0.0005 | 0 | neg. |
| 161-170 | 170 | 1 | 0.0005 | 3.0 | neg. |
| 171-180 | 180 | 1 | 0.0005 | 3.5 | neg. |
| 181-183 | 183 | 2 | | | 2.2 |
| 184-186 | 186 | 2 | | 13.8 | 4.2 |
| 187-190 | 190 | 2 | 0.002 | | |
| 191-198 | 198 | 2 | | 15 | 8.2 |
| 199-200 | 200 | 2 | 0.0025 | | |
| 201-206 | 206 | 1 | | 8 | 2.8 |
| 207-210 | 210 | 1 | 0.0007 | | |
| 211-220 | 220 | 1 | 0.0010 | | 4.6 |
| 221-235 | 235 | 1 | 0.0015 | 19.6 | |

¹ Neg. no loss in weight but a gain of about 1-1.2 mg.

Cursory study of the data presented in Table I indicates that the rate of flow should be less than 160 bbls./hr./ton of carbon of the "Benzorbon" type but can be at least about 82 bbls./ton and can be about 140 bbls./hr./ton maximum. In other words, since 1 ton of "Benzorbon" activated carbon has a surface area of about 520 square miles, the throughput of unstable fuel oil can be up to about 0.28 bbls. per square mile of surface area but less than about 0.3 bbls. per square mile of surface area.

It will also be observed that the mercaptan-sulfur concentration of the treated fuel oil is not a direct measure of the stability of the treated fuel. Thus, while the mercaptan-sulfur concentration of the treated fuel remained constant until the unit had been on stream 180 hours, the oxidation deposit increased from substantially zero to 3.5 mg./liter while the lead corrosion remained substantially constant at not >3 mg./100 cm.³ (neg.=<3 mg. Furthermore, it will be observed that after increasing the rate of flow to 2 liters per hour as a result of which the mercaptan-sulfur content of the treated oil rose to 0.0025 weight per cent after 10 hours and then decreased 0.0007 (comparable with 0.0005), after another 10 hours the lead corrosion increased to 8.2 mg./100 cm.³ but did not decrease to negative in the next 10 hours. That is, although the effectiveness of the activated carbon to decrease the mercaptan-sulfur content of the treated oil was restored to substantially the previous value by decreasing the rate of flow of fuel to be treated, the lead corrosion never did decrease to the previous negative value of =<3 mg./100 cm.³. It follows that while the activated carbon is effective in decreasing the mercaptan-sulfur content of the treated fuel until about 17,000 barrels of fuel per ton of carbon have been treated, the carbon is only effective for treating about 14,600 barrels of fuel per ton of carbon. Furthermore, it is to be noted when the treated oil is subjected to the oxidation test, its appearance after 10,550 barrels of fuel per ton of carbon have been treated is light and clear, whereas with an increase in the total volume of fuel treated, the color becomes brown and the fuel becomes cloudy. Consequently, after treating about 10,000 barrels of cracked fuel per ton of activated carbon, the carbon is regenerated. In actual operation, as described herein, after about 11,000 to about 14,000 barrels of cracked gas oil have been stabilized per ton of "Benzorbon" type activated carbon between regenerations. The unstabilized gas oil so treated when subjected to the oxidation test hereinbefore described deposited 70.4 milligrams of material per 100 milliliters of gas oil. After treatment, i. e., contact with air in the presence of activated carbon impregnated with alkali metal hydroxide, the stabilized gas oil when subjected to the same oxidation test left no deposit, i. e., zero milligrams of deposit per 100 milliliters of treated oil.

The cracked gas oil or the blend of cracked and straight run gas oil or any of the fractions of cracked gas oil of a blend of cracked and straight-run gas oil can be treated in accordance with the principles of the present invention in any suitable manner whereby the unstable fuel is subjected to a mildly oxidizing reaction with air or oxygen or any gas containing free oxygen in the presence of activated carbon impregnated with alkali metal hydroxide. It is preferred to use an activated carbon of the "Benzorbon" type characteristics of which have been given hereinbefore. Usually when the gas oil has been stored for at least three hours in contact with air or other gas containing free oxygen, the gas oil absorbs sufficient air to supply substantially all of the oxygen required for the oxidizing process. Consequently, it is only necessary to provide for positively mixing air or other gas-containing free oxygen with the fuel fraction to be treated when the fuel fraction is taken directly from the still or has not been stored in contact with a gas containing free oxygen for at least three hours. However, the drawing illustrating the principles of the present invention has been made to include provision for positively mixing air or other gas containing free oxygen with the fuel fraction to be treated.

As mentioned hereinbefore, any unstable fuel oil fraction can be treated in accordance with the principles of the present invention. Thus, a cracked gas oil can be stabilized and as a consequence the distillates, domestic fuel, diesel fuel, etc., will be stabilized. On the other hand, unstable fuel fractions such as kerosene, distillate fuel oil, diesel oil and the like can be individually treated to stabilize the distillate with respect to sedimentation and/or color. Finally, when the product sold to the consumer is a blend of cracked and straight-run distillates, the cracked distillate can be treated separately and then blended or the cracked fuel can be mixed with the straight-run fuel and the blend thus obtained treated. Accordingly, although the principles of the present invention will be described, discussed and illustrated by reference to the treatment of cracked gas oil, it is to be understood that gas oil distillates alone or blended with straight-run distillates can be treated in the same manner.

The drawing is a highly schematic flow sheet of the process steps comprising the present invention. Activated carbon, preferably of the "Benzorbon" type is charged to a treater such as treaters 4 and 5. Since after the treatment of 10 to 15 thousand barrels (42 gal. each) of unstable fuel per ton results in a loss of activity by the activated carbon, it is preferable to use two treaters so that for continuous operation one can be on stream while the other is passing through the regeneration part of the cycle. Under circumstances such that treating can be stopped during regeneration only one treater will be needed.

The fresh or regenerated activated carbon before use as a catalyst in the oxidative stabilization of fuel fractions with respect to sediment and/or color must be impregnated with alkali metal hydroxide to obtain an impregnated activated carbon containing about 5 to about 15, preferably about 12, percent by weight alkali metal hydroxide. While aqueous solutions of alkali metal hydroxide containing any suitable and convenient concentration of alkali metal hydroxide can be used to impregnate the activated carbon, it is preferred to use solutions containing 10 to 20, preferably 15, percent alkali metal hydroxide by weight hereinafter designated as containing 10–20, preferably 15, weight percent alkali metal hydroxide.

The active carbon can be impregnated before charging the same to the treaters or the active carbon can be charged to the treaters and the impregnating aqueous alkali metal hydroxide solution charged to the treaters thereafter or circulated from storage through the treaters and back to storage. Either method can be used in the manner illustrated by the flow sheet presented in the drawing.

Referring now to the drawing. Treaters 4 and 5 are of any suitable type of container in which contact between a solid, a liquid and a gas can be obtained. As illustrated, treaters 4 and 5 are cylindrical in shape and substantially devoid of any packing such as Rashig rings and the like. Each treater is charged through a port, not shown, to a suitable height with activated carbon preferably of the "Benzorbon" type. Aqueous alkali metal hydroxide solution containing 10–20, preferably 15, weight percent alkali metal hydroxide is drawn from hydroxide storage container 1 through pipes 2 and 33 under control of valve 44 by pump 3 with valves 45, 34, 8, 10, 37, 38, 39 and 40 closed. Pump 3 discharges the aqueous alkali metal hydroxide solution into pipe 6 under control of valve 7. The aqueous alkali metal hydroxide solution flows along pipe 6 to pipes 14 and 15 through which the solution flows under control of valves 12 and 13 to lines 16 and 17. The hydroxide solution flows downwardly through lines 16 and 17 into treaters 4 and 5 respectively. When the hydroxide solution is not to be circulated through the treaters until the active carbon therein contains about 5 to about 15, preferably about 12, weight percent alkali metal hydroxide, valves 9 and 11 are closed and the treaters are filled with hydroxide solution to a point above the upper level of the bed of active carbon in each treater. When the hydroxide solution is to be circulated, valves 9 and 11 are open and the hydroxide solution flows downwardly through the treaters. In either case, the hydroxide solution flows from treater 4 through line 30 to pipe 18 and thence to pipe 20 and from treater 5 through line 19 to pipe 20. From pipe 20 the hydroxide solution flows to pipe 21 under control of valve 22 and back to hydroxide solution storage container 1.

The active carbon now containing about 5 to about 15, preferably about 12, weight percent alkali metal hydroxide is ready for use as a catalyst in the oxidation of those phenolic, and/or pyrrolic, and indolic type materials which appear to be potential sources of sediment and/or discoloration.

The unstable cracked distillate or a blend of unstable cracked distillate and stable straight-run distillate or unstable cracked gas oil or a blend of unstable cracked gas oil and stable straight-run gas oil, for simplicity the following discussion and description is of the treatment of a cracked gas oil, is drawn by pump 23 from a source not shown through line 24. Pump 23 discharges the unstable cracked gas oil into line 25. With valve 10 closed, the unstable gas oil flows through line 30 under control of valve 8. Assuming that the gas oil has not absorbed sufficient oxygen prior to discharge into line 25, air is drawn from a source not shown through pipe 27 by blower or compressor 26 and discharged under control of valve 29 through pipe 28 into line 25. The mixture of air and unstable gas oil flows through line 25 to line 30 and thence to treater 4. With valves 9, 12 and 38 closed and valve 37 open the gas oil and oxygen or gas containing free oxygen, for example air, flows upwardly through the bed of activated carbon in treater 4. After passage through the bed of activated carbon in treater 4 the gas oil is stabilized with respect to the formation of sediment and color. The treated oil flows from treater 4 through lines 16 and 31 under control of valve 37 to further treatment when necessary or desirable, distribution or storage.

After the treatment of about 15 to about 20 thousand barrels (42 gals. each) of unstable fuel, the activated carbon even of the "Benzorbon" type loses sufficient of its capability to catalyze the oxidation of the phenolic, pyrrolic and/or indolic like materials to require regeneration. Accordingly, the mixture of fuel and air is diverted from treater 4 to treater 5 so that treatment of the fuel can be continued while the activated carbon in treater 4 is being regenerated.

The mixture of fuel and gas containing oxygen is diverted from treater 4 to treater 5 by closing valve 8 in line 30 and opening valve 10 in line 25. With valves 11, 13 and 37 closed and valve 39 open, the mixture of fuel and gas containing free oxygen flows along line 25 to line 19 and thence upwardly through the bed of activated carbon in treater 5. The treated fuel leaves treater 5 through line 17 under control of valve 39 to further treatment when desirable or necessary or to distribution or to storage.

It has been found advantageous to wash the spent activated carbon before regeneration or after regeneration but before impregnation with alkali metal hydroxide. Thus, any suitable solvent for the contaminants of the spent activated carbon such as heavy naphtha, kerosene, etc., is drawn from wash naphtha storage 32 through pipe 33 under control of valve 45 by pump 3. With valves 13, 37, 38, 8, 11, 22 and 34 closed and valves 7, 12, 9 and 35 open, pump 3 discharges the wash naphtha into pipe 6. The wash naphtha flows through pipe 6 to pipe 14 and thence through pipe 16 to treater 4. The wash naphtha flows downwardly through the bed of spent activated carbon in treater 4 and leaves treater 4 through pipes 30 and 18 under control of valve 9. The wash naphtha and contaminants contained therein flow through pipe 18 to pipe 20 and thence through pipe 42 under control of valve 35 to container 32.

After washing with naphtha or other solvent for the contaminants in the bed of spent activated carbon in treater 4, pump 3 is stopped, valves 7 and 35 are closed, and valves 34 and 43 are opened. Opening of valve 43 permits steam from any suitable source to flow through pipe 36 to pipe 41 and thence through pipe 16 to treater 4. The steam flows downwardly through the bed of spent activated carbon in treater 4 regenerating the activated carbon. The steam and materials volatilized from the spent activated carbon flow from treater 4 through line 18 and pipe 20 to waste or recovery under control of valves 9 and 34. When the carbon in treater 4 has been regenerated, which usually requires about five minutes minimum to about 20 hours maximum, valve 8 is closed and aqueous alkali metal hydroxide solution is circulated from container 1 through the bed of regenerated activated carbon in treater 4. Alternatively, the aqueous alkali metal hydroxide solution can be pumped into treater 4 from container 1 and with valves 8 and 9 closed allowed to remain in contact with the carbon until the regenerated activated carbon has absorbed about 5 to about 15 weight percent, preferably about 12 weight percent, alkali metal hydroxide.

When circulating the aqueous alkali metal hydroxide solution from container 1 through the bed of regenerated activated carbon in treater 4, pump 3 draws the aqueous solution from container 1 through pipes 2 and 33 under control of valve 44 with valve 45 closed. Pump 3 discharges the aqueous solution into pipe 6. The aqueous solution flows along pipe 6 to pipe 14. With valves 13 and 37 closed, the aqueous solution flows through pipe 14 under control of valve 12 to line 16 and thence to treater 4. The aqueous solution flows downwardly through the bed of regenerated activated carbon in treater 4 and with valve 8 closed, leaves treater 4 through line 30 and pipe 18 under control of valve 9. The aqueous solution flows through pipe 18 to pipe 20 and, with valves 11 and 34 closed and valve 22 open, flows along pipe 20 to pipe 21 and thence to container 1. Circulation of the aqueous alkali metal hydroxide solution is continued until the regenerated activated carbon in treater 4 has absorbed about 5 to about 15, preferably about 12, weight percent alkali metal hydroxide.

When the regenerated activated carbon in treater 4 has been impregnated with alkali metal hydroxide, pump 3 is stopped and the treater drained into container 1. The bed of regenerated activated carbon is then ready for use in stabilizing fuel as described hereinbefore.

When the activated carbon in treater 5 is spent with respect to its capability to catalyze the oxidation reaction, the mixture of fuel and gas containing free oxygen is diverted to treater 4 by closing valves 10 and 39 and opening valves 8 and 37. Flow of the mixture of fuel and gas containing free oxygen proceeds as described hereinbefore.

While treater 4 is on stream, the bed of spent activated carbon in treater 5 is regenerated as described hereinbefore for the bed of spent activated carbon in treater 4. That is to say, wash naphtha is drawn from container 32 by pump 3 through pipe 33 under control of valve 45. Pump 3 discharges the wash naphtha into pipe 6 under control of valve 7. The wash naphtha flows along pipe 6 to pipe 15. With valves 12, 39 and 40 closed and valve 13 open, the wash naphtha flows from pipe 6 through pipe 15 and line 17 to treater 5. The wash naphtha flows downwardly through the bed of spent activated carbon in treater 5 washing contaminants therefrom and leaves treater 5 through pipe 19 under control of valve 11. The wash naphtha flows from pipe 19 to pipe 20 and with valve 34 closed, flows through pipe 42 under control of valve 35 to container 32.

After washing the spent activated carbon with a solvent for the contaminants thereof, the spent carbon is regenerated by steaming. That is to say, valve 43 is opened and valves 34 and 35 are closed.

Steam is admitted from any suitable source through pipe 36 under control of valve 43. The steam flows through pipe 36 to pipe 42. With valves 38 and 39 closed and valve 40 open, the steam flows from pipe 42 to pipe 17 and thence to treater 5. The steam flows downwardly through the bed of spent activated carbon in treater 5. The steam and volatilized contaminants of the spent carbon leave treater 5 through line 19. With valves 10, 22 and 35 closed and valve 34 open, the steam and volatilized contaminants flow from line 19 through pipe 20 to waste or recovery.

When the activated carbon in treater 5 has been regenerated, the steam is cut-off and the regenerated activated carbon is impregnated with alkali metal hydroxide. Aqueous alkali metal hydroxide solution is drawn from container 1 through pipe 2 under control of valve 44 by pump 3 with valve 45 closed. Pump 3 discharges the aqueous alkali metal hydroxide solution into pipe 6 under control of valve 7. With valves 12, 39 and 40 closed and valve 13 open the aqueous alkali metal hydroxide solution flows from pipe 6 through pipe 15 to line 17 and thence to treater 5. The aqueous solution flows downwardly through the bed of regenerated activated carbon in treater 5. The aqueous solution flows from treater 5 through line 19 under control of valve 11 to pipe 20. With valves 34, 35 and 10 closed, the aqueous solution flows through pipe 20 to pipe 21 and under control of valve 22 therethrough to container 1. When the regenerated activated carbon has absorbed about 5 to about 15 weight percent of alkali metal hydroxide, the regenerated carbon is ready for use as a catalyst in the stabilization of fuel fractions.

Illustrative of the results that are obtained when stabilizing fuel fractions such as cracked gas oil in the manner described herein, are the following data:

| Stock | BV Test,[1] mg./100 ccm. | Oxidation Test,[2] mg./100 ccm. |
|---|---|---|
| Cracked Gas Oil, 581° F., E. P. untreated | 84–89 | 70.4 |
| Straight-run Gas Oil untreated | 0 | 0 |
| 30% cracked gas oil<br>70% straight-run gas oil untreated | 10–19 | 4.2 |
| 30% cracked gas oil<br>70% straight-run gas oil treated as described herein | 0 | 0 |
| Cracked Gas Oil treated as described herein | 0 | 0 |

[1] Lead corrosion test #1 described hereinbefore.
[2] Oxidation deposit test described hereinbefore.

It is to be observed that treatment with aqueous alkali metal hydroxide of either the cracked gas oil alone or in combination with straight-run gas oil does not produce a comparable product.

| Stock | BV Test,[1] mg./100 ccm. | Oxidation Test,[2] mg./100 ccm. |
|---|---|---|
| Cracked Gas Oil treated with 15% NaOH | 32 | |
| Cracked Gas Oil treated as described herein | 0 | 0 |
| 30% cracked gas oil and 70% straight-run gas oil treated with 15% NaOH | 2.6 | |
| 30% cracked gas oil and 70% straight-run gas oil treated as described herein | 0 | 0 |

[1] Lead corrosion test #1 described hereinbefore.
[2] Oxidation deposit test described hereinbefore.

It is necessary to emphasize that there does not appear to be a direct correlation between the mercaptan content of the treated oil and the quality thereof as determined by the lead corrosion or oxidation deposit tests. Thus, treatment as described hereinbefore can yield treated oil giving good oxidation and lead corrosion tests even in the presence of a relatively high percentage of sulfur. The following results are illustrative of the foregoing.

Mercaptan sulfur_____ 0.010–0.015 weight per cent
Lead corrosion___ 1 mg./100 cc. (neg.=>3 mg./100 cc.)
Oxidation test_____ 0.0

We claim:
1. A method of stabilizing fuel fractions of petroleum oil which comprises contacting in the presence of free molecular oxygen a fuel fraction of petroleum oil boiling above the gasoline range and being unstable with respect to the formation of sediment and color with a bed of a reagent consisting essentially of activated carbon containing about 5 to about 15 percent alkali metal hydroxide and at a rate not exceeding about 160 barrels of said fuel per hour per ton of said activated carbon until the lead corrosion test exceeds 3 milligrams per 100 cubic centimeters of treated oil, stopping the flow of said fuel, washing said carbon with a solvent for contaminants and steaming said carbon to regenerate the same and impregnating said regenerated carbon with about 5 to about 15 weight percent alkali metal hydroxide, said activated carbon being an activated carbon having a bulk density (dried at 220° F.) of about 18.53 pounds per cubic foot, a true density (voids filled with helium) of about 118 pounds per cubic foot, a surface area of at least about 1485 square meters per gram, and an average pore diameter of 41 angstroms.

2. A method of stabilizing fuel fractions of petroleum oil which comprises contacting in the presence of free molecular oxygen a fuel fraction of petroleum oil boiling above the gasoline range and being unstable with respect to the formation of sediment and color with a bed of a reagent consisting essentially of activated carbon containing about 5 to about 15 weight percent alkali metal hydroxide at a rate not exceeding about 160 barrels of said fuel per hour per ton of said activated carbon until the lead corrosion test exceeds 3 milligrams per 100 cubic centimeters of treated oil, stopping the flow of said fuel, washing said carbon with a solvent for contaminants and steaming said carbon to regenerate the same and impregnating said regenerated carbon with about 15 weight percent alkali metal hydroxide, said activated carbon being an activated carbon having a steep adsorption isotherm and a high percentage of coarse pores.

References Cited in the file of this patent

UNITED STATES PATENTS

| | | |
|---|---|---|
| 1,098,764 | Richter | June 2, 1914 |
| 1,890,516 | Lachman | Dec. 13, 1932 |
| 1,955,607 | Rees et al. | Apr. 17, 1934 |
| 1,971,172 | Benedict | Aug. 2, 1934 |